US008798521B2

(12) United States Patent
Lang et al.

(10) Patent No.: US 8,798,521 B2
(45) Date of Patent: *Aug. 5, 2014

(54) CONTENT CREATION IN AN ONLINE LEARNING ENVIRONMENT

(75) Inventors: Richard Lang, Sebastopol, CA (US); Colt Briner, Windsor, CA (US)

(73) Assignee: Collaborize Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,988

(22) Filed: Jul. 20, 2012

(65) Prior Publication Data

US 2013/0022955 A1 Jan. 24, 2013

Related U.S. Application Data

(60) Provisional application No. 61/509,859, filed on Jul. 20, 2011, provisional application No. 61/535,271, filed on Sep. 15, 2011.

(51) Int. Cl.
*G06F 15/16* (2006.01)
*G09B 3/00* (2006.01)

(52) U.S. Cl.
USPC .......................................... 434/350; 709/204

(58) Field of Classification Search
USPC ................. 434/323, 350–352, 362, 365, 322; 705/319, 326; 707/608; 715/758, 751, 715/759; 725/9; 709/201, 202, 204, 205, 709/223, 224
See application file for complete search history.

(56) References Cited

U.S. PATENT DOCUMENTS

| | | | |
|---|---|---|---|
| 6,674,992 B2 * | 1/2004 | Helmick et al. | 434/362 |
| 7,280,991 B1 * | 10/2007 | Beams et al. | 706/46 |
| 7,634,546 B1 * | 12/2009 | Strickholm et al. | 709/207 |
| 8,103,618 B2 * | 1/2012 | Carter et al. | 707/608 |
| 2008/0184133 A1 * | 7/2008 | Lee et al. | 715/751 |
| 2009/0007167 A1 * | 1/2009 | Artom | 725/9 |
| 2010/0151431 A1 * | 6/2010 | Miller | 434/350 |
| 2011/0055403 A1 * | 3/2011 | Balachandran et al. | 709/227 |
| 2011/0289142 A1 * | 11/2011 | Whalin et al. | 709/203 |
| 2011/0289433 A1 * | 11/2011 | Whalin et al. | 715/753 |
| 2012/0036423 A1 * | 2/2012 | Haynes et al. | 715/230 |
| 2013/0052629 A1 | 2/2013 | Lang | |

OTHER PUBLICATIONS

U.S. Appl. No. 13/645,393 Office Action mailed Oct. 15, 2013.
U.S. Appl. No. 13/645,393 Office Action mailed Apr. 24, 2013.

* cited by examiner

*Primary Examiner* — Peter Egloff
(74) *Attorney, Agent, or Firm* — Lewis Roca Rothgerber LLP

(57) ABSTRACT

A collaborative learning service allows for a participant to create and share content for discussion with other participants in an online learning environment. Tagged content along with descriptive content regarding the tagged content is received from a participant. The content may be associated with a particular topic and/or forum. The content is published into a forum for discussion amongst participants. Following the publishing of the content to the online learning environment, participants, such as educators and students, may discuss, interact, and collaborate with one another regarding the content. The content may be stored in a library of topics for subsequent retrieval by any participant namely an educator.

15 Claims, 26 Drawing Sheets

Edit Title

Edit Description

Description Added

Add Attachment

Add Caption

US 8,798,521 B2

CONTENT CREATION IN AN ONLINE LEARNING ENVIRONMENT

CROSS-REFERENCE TO RELATED APPLICATIONS

This application claims the priority benefit of U.S. provisional application No. 61/509,859 filed on Jul. 20, 2011 and entitled "Content Creation Toolbar and Application" and U.S. provisional application No. 61/535,271 filed on Sep. 15, 2011 and entitled "Content Creation Toolbar and Application." The disclosure of each of the aforementioned applications is incorporated herein by reference.

BACKGROUND OF THE INVENTION

1. Field of the Invention

The present invention generally concerns creating content in an interactive, online learning environment. More particularly, the present invention relates to a content creation toolbar and application that allows a participant to create and share content with other participants to encourage active discussion in an online learning environment.

2. Description of the Related Art

As computing devices and mobile technologies have become a more pervasive aspect of everyday life, online and distance learning is no longer an idea of the future. Online and distance learning has become increasingly common especially with increased network bandwidth and the improved quality of online video and audio presentation. While educators are now able to present quality content to participants, such presentations are typically, by and large, static lectures that fail to fully engage participants in an interactive discussion of a topic at issue.

In addition, while there are services that serve as repositories of teaching curriculum from various contributing educators, such repositories are limited in that content varies greatly in presentation, format, and approach. Educators may often spend a great deal of time and resources searching and retrieving acceptable content.

There is a need for online and distance learning that encourages increased involvement and engagement between participants. There is a further need for a library of content that fosters such engagement and includes content with indicia of such content most likely to generate increased participation.

SUMMARY OF THE INVENTION

A content creation toolbar and application may foster interaction and collaboration between participants, such as educators and students, by allowing for the creation and sharing of content. An educator prepares, tags, and describes content of interest which is then published and shared to other participants of an online learning environment or classroom. Students may respond or provide feedback and interact with one another regarding the published content.

In a first claimed embodiment, a method for content creation in an online learning environment is claimed. Through this method, a topic for discussion between a plurality of participants is created. Tagged content associated with the topic for discussion is received from a computing device of a participant along with descriptive information regarding the tagged content. The tagged content is published into a forum and the forum is updated upon the receipt of feedback from another participant regarding the tagged content.

In a second claimed embodiment, a system for content creation in an online learning environment is claimed. The system includes memory for storing tagged content received from a participant and an application server. The application server creates a topic for discussion, receives tagged content and descriptive information regarding the tagged content from a participant, publishes the tagged content into a forum, and updates the forum with feedback received from one or more participants in response to the tagged content.

In a third claimed embodiment, a non-transitory computer-readable medium is claimed. The storage medium includes a computer program that is executable by a processor to perform a method for content creation in an online learning environment. The method includes creating a topic for discussion between a plurality of recipients, receiving tagged content from a participant of a plurality of participants, receiving descriptive information from the participant regarding the tagged content, publishing the tagged content into a forum, and updating the forum with feedback received from one or more participants in response to the tagged content.

BRIEF DESCRIPTION OF THE FIGURES

FIGS. 3A-3I illustrate interfaces displaying a toolbar including an icon and ask modal.

DETAILED DESCRIPTION

Embodiments of the present invention may provide a collaborative learning service that allows a participant to create and share content for discussion with other participants in an online learning environment. The content may be associated with a particular topic and/or forum. Following the uploading or publishing of the content to the online learning environment, participants, such as educators and students, may discuss, interact, and collaborate with one another regarding the content in real-time. As content is presented and discussions are occurring in real-time, the collaborative learning service produces a more reflective engagement between participants. Content may be stored in a library of topics for subsequent retrieval by any participant namely an educator.

Figure 1:
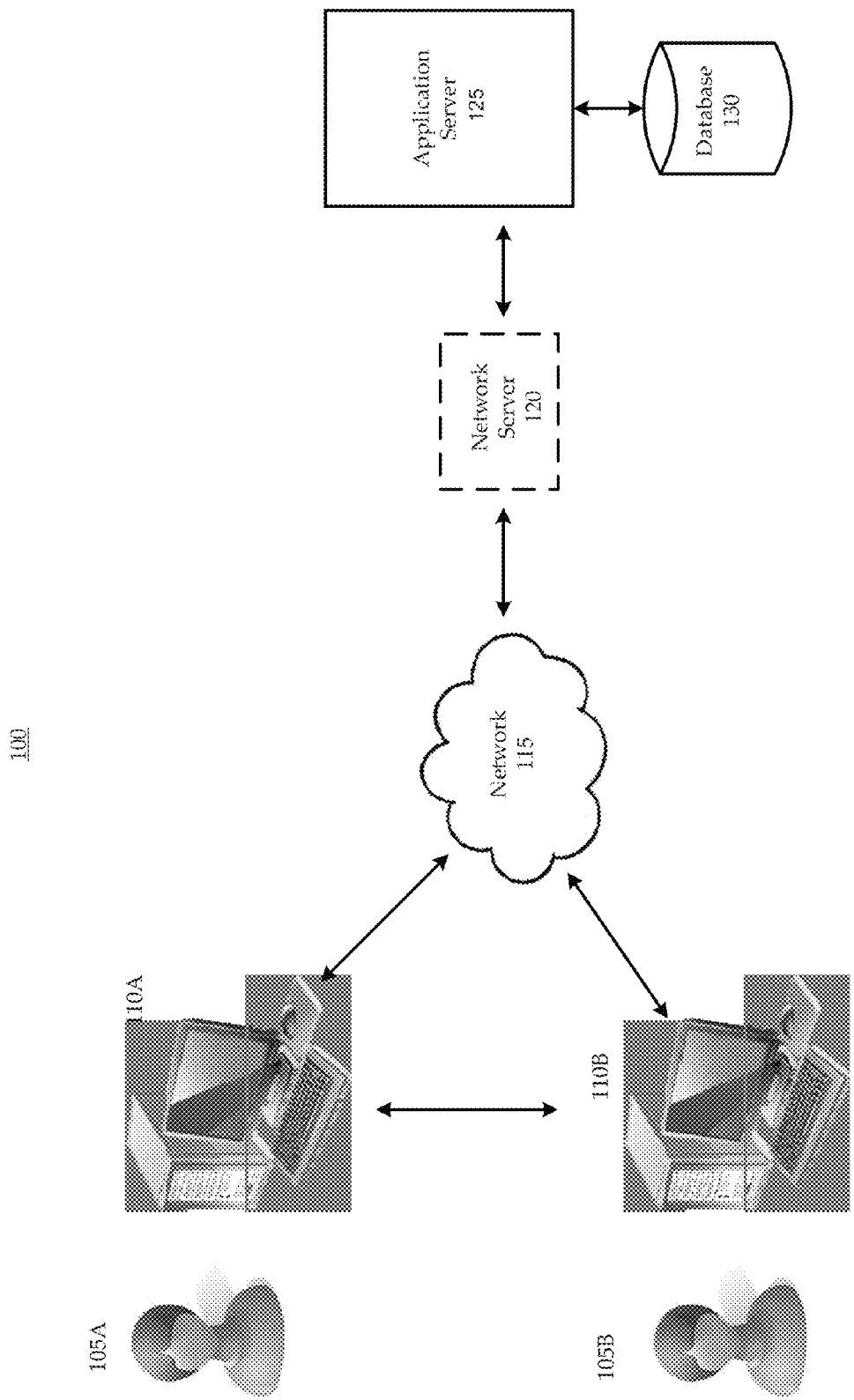
FIG. 1 illustrates a system used for content creation in an online learning environment.

FIG. 1 illustrates a system for content creation in an online learning environment. The system 100 of FIG. 1 includes users (105A, 105B), computing devices (110A, 110B), network 115, optional network server 120, application server 125, and database 130. System 100 may comprise a plurality of users (105A, 105B) and computing devices (110A, 110B) in connection with a collaborative learning service.

In FIG. 1, a user accesses the collaborative learning service using any computing device. Using computing device 110A, for example, user 105A may subscribe (e.g., create an account) or register with the collaborative learning service provided by application server 125. Once user 105A has registered with the collaborative learning service, user 105A may perform a login and access the collaborative learning service to perform a variety of tasks such as creating or uploading content, sharing content, accessing content, and creating discussion topics and/or forums. User 105A may be a content provider and/or content consumer. A content provider, for example, may include a teacher or educator and a content consumer may be a student.

When registering with the collaborative learning service, user 105A may be required to input or provide (via computing device 110A) registration information or user data including but not limited to name, user ID, password address, phone number, e-mail address, birthday, age, gender, relationship status, employment status, and education. User 105A may also provide other pertinent data including demographic information, geographic location, interests, hobbies, and preferences. User registration information and data may be used to generate a profile of user 105A. Application server 125 may review or consider a user profile to suggest particular topics or forums of interest to user 105A.

User data and profile information may be stored in database 130. A user may have one or more user profiles. User 105A, for example, may have a "student" profile, "teacher" profile, "professional" profile, or "non-profit" profile. A type of profile may correlate with searching content or varying access rights or pricing or fees (e.g., purchasing of content) associated with the collaborative learning service.

System 100 may include database 130 for storing data. Database 130 may store content provided by users (105A, 105B), user-related information, profile information, preferences, and other data for use with the collaborative learning service provided by application server 125. Database 130 may be separate from or integrated with application server 125. Database 130 may be distributed. Database 130 may also store any updates to discussions or topics, or user data or profile data received from/provided by user 105A.

Computing devices (110A, 110B) are inclusive of a general purpose computing device capable of accessing information over a network. Computing devices (110A, 110B) may be any computing device known in the art such as a workstation, laptop computer, net book computer, tablet computer, mobile device, cellular telephone, or the like, that can communicate over network 115. Computing devices (110A, 110B) include software and/or hardware capable of sending, receiving, and processing data such as user-provided content or user profile or registration data. Computing device 110A may receive data from user 105A and send the data over network 115 to application server 125 for processing. Computing devices (110A, 110B) may also offer location-based information such as that generated through cellular network base stations, IP network access, or GPS data.

Network 115 is inclusive of any communication known in the art such as the Internet, Local Area Network (LAN), Wide Area Network (WAN), intranet, extranet, private network, or other network. Application server 125 may be accessed via optional network server 120. Network server 120 may receive and process data and/or requests from computing device 110A. User 105A, for example, may request and provide data to become a registered subscriber with the collaborative learning server provided by application server 125. Processing the data and/or request may include sending data to application server 125, receiving a response from application server 125, and sending a response or data to network server 120. Network server 120 may then forward the response or data to computing device 110A.

Application server 125 may be implemented in a general computing device that otherwise communicates with database 130 and network server 120. An example of such a device is the general computing system illustrated in FIG. 6. One or more software applications or modules may be stored in memory and executable by a processor (not shown) at application server 125. The present collaborative learning service may be implemented by one or more processors that execute instructions stored in one or more memory mediums. The executed instructions may result in the processor(s) generating and providing one or more graphical interfaces. FIGS. 3A-3I, 4A-4G, and 5A-5G illustrate examples of interfaces that may be used to implement embodiments of the present invention.

Figure 2:
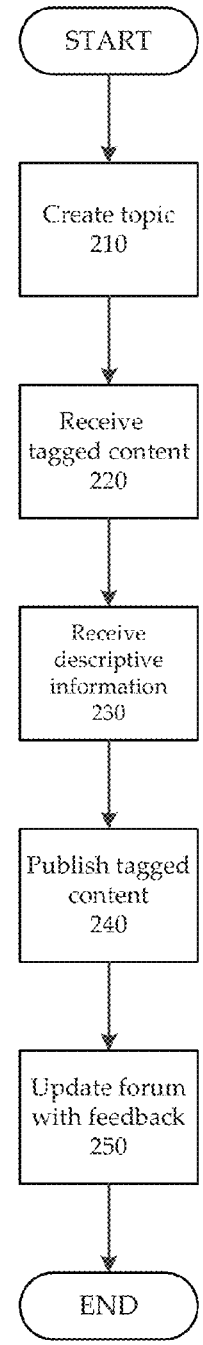
FIG. 2 illustrates a method for content creation in an online learning environment.

FIG. 2 illustrates a method for content creation in an online learning environment. The steps identified in FIG. 2 (and the order thereof) are exemplary and may include various alternatives, equivalents, or derivations thereof including but not limited to the order of execution of the same. The steps of the method of FIG. 2 (and its various alternatives) may be embodied in hardware or software including a non-transitory computer-readable storage medium (e.g., an optical disc or memory card) having instructions executable by a processor of a computing device. A user may launch or activate the method of FIG. 2 by opening or activating an application in a computing device such as a mobile device. The collaborative learning service may also include one or more toolbars (e.g., via an installed plug-in) that enhance features and functionality associated with the retrieval, access, uploading, and sharing of content.

The method 200 of FIG. 2 may allow a participant (e.g., a teacher or educator) to create content via a collaborative learning service to stimulate interest and foster interactive discussion amongst participants (i.e., students) regarding tagged or selected content. The collaborative learning service, for example, may include or be divided into various forums, verticals, communities, categories or the like that are each directed towards a particular topic. Each forum may contain a plurality of topics or individual contributions of tagged content from one or more participants. For example, one forum may be directed towards World War II while another may be directed towards the 2012 U.S. presidential election.

In one embodiment, a forum could include or be designated as the online learning environment or classroom of a particular educator participant. After an educator has created and posted content into a forum, student participants may begin to engage with one another by responding to the content. Participants may submit feedback such as questions, comments, criticism, ratings, posting, evaluations, etc. that all participants are able to view and review. Access rights to a particular forum may be set by a system administrator or by a creator of the forum (e.g., educator). A forum may be public and accessible to a number of participants or may be private and accessible to a select group of participants.

Embodiments of the present invention leverage the mechanics of tagging or "grabbing" content. Content may include text, audio, video, or other media. Content may be found or made available via the Internet or other digital sources or may be contained within a library of content stored in database 130. If user 105A is viewing content and is interested in the media (e.g., a teacher believes that the content is worthy of classroom discussion in the present time or the future), user 105A may "grab" or select the content using any form known in the art such as highlighting, "drag and drop," or "tagging."

In one embodiment, user 105A may employ a toolbar within a web browser 300 to create a topic for discussion. User 105A may access features and functionality of the collaborative learning service via an icon 305 that appears in a navigation panel of a web browser 300. FIG. 3A illustrates an interface displaying the navigation panel with icon 305. Upon clicking icon 305, user 105A may select and create a new topic for discussion by activating or launching an ask modal.

Figure 3B:
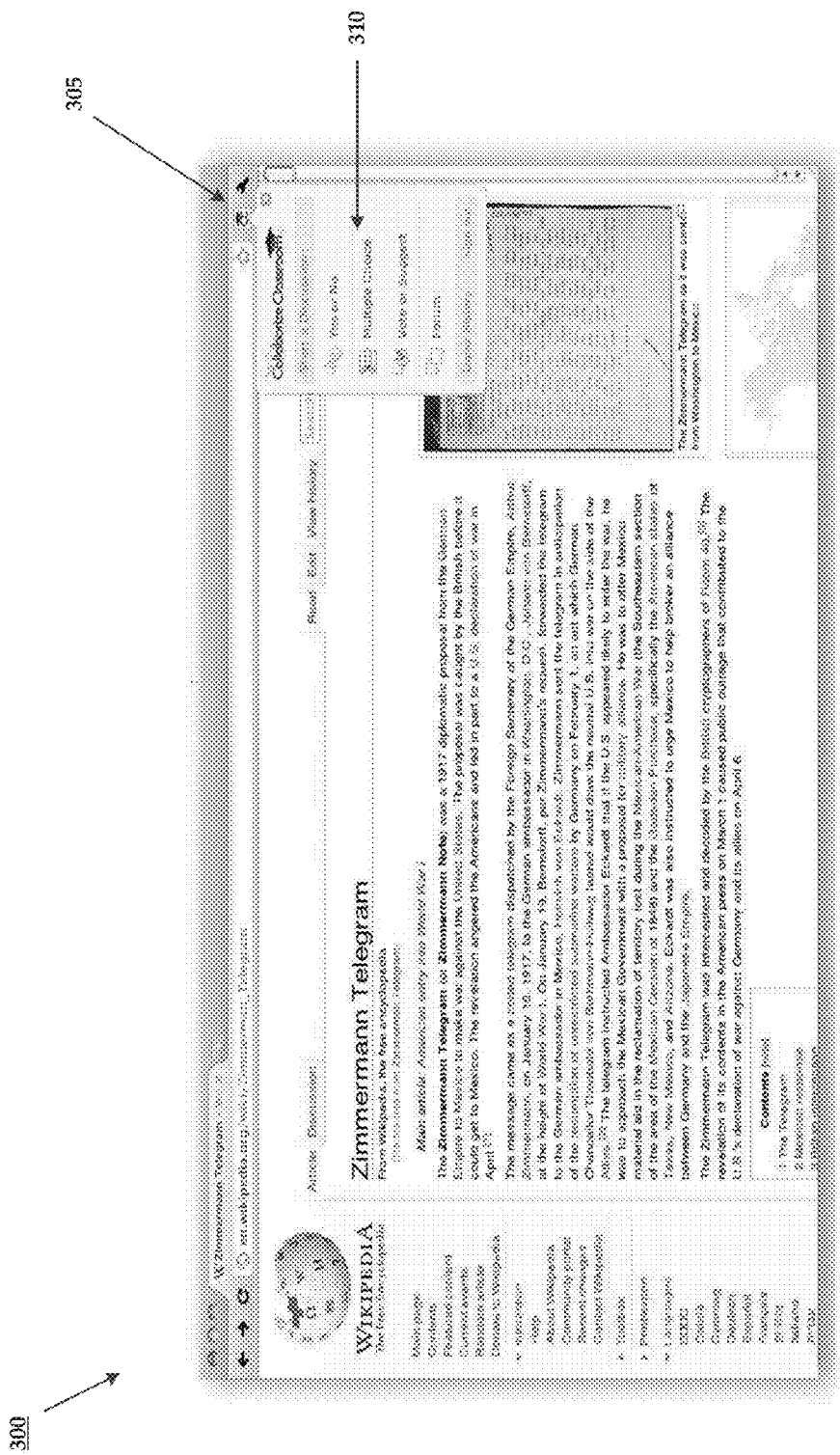
Figure 3C:
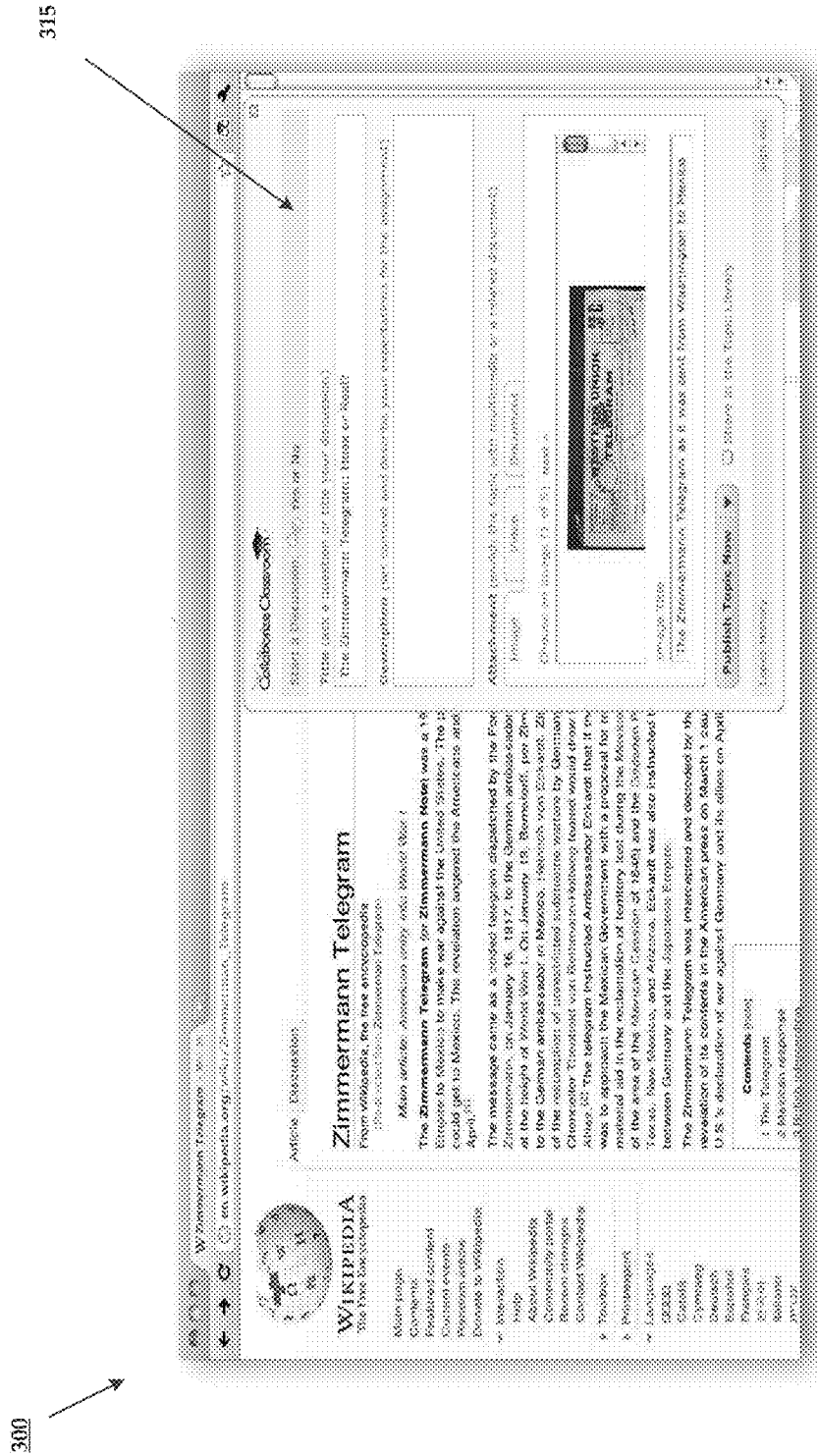
Figure 3D:
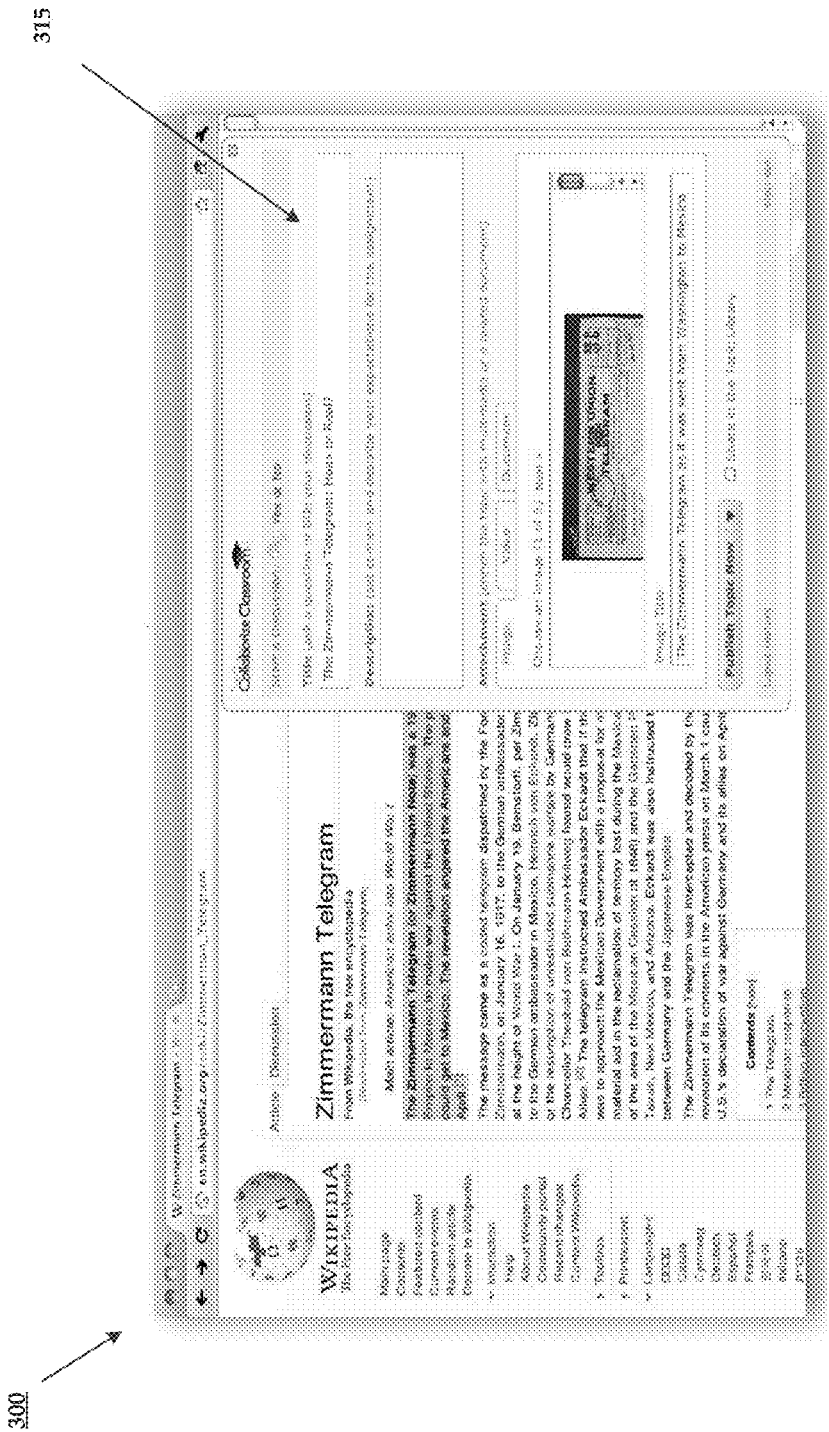

By using information and content provided by user 105A, application server 125 may generate a topic for discussion. At step 210, application server 125 creates a topic for discussion. For example, upon clicking or launching icon 305 and an ask modal, user 105A may start a discussion by selecting a topic type or question type such as "Yes/No," "Multiple Choice," "Vote or Suggest," "Forum," or the like. FIG. 3B illustrates an interface displaying a drop down menu 310 showing exemplary topic types. A topic type may help to develop or stimulate responses for a topic by directing a specific query towards the participants. User 105A may enter a title for the topic. FIG. 3C illustrates an interface including an ask modal 315. The use of the ask modal or topic type is key to delivering a consistent interface and interactive, learning environment. By maintaining a uniform structure, various participants, namely educators, may develop content that can be used by other educators and students. The collaborative learning service thus provides a platform for the development of lectures and presentations on specific topics or question types. Additional concepts and details regarding a collaborative learning environment are found in co-pending application Ser. No. 13/430,655 and entitled "Collaborative and Interactive Learning," the disclosure of which is incorporated herein by reference.

Figure 4A:
FIGS. 4A-4G illustrate interfaces displaying content creation in a mobile device.
Figure 4B:
Figure 4C:
Figure 4D:
Figure 4E:
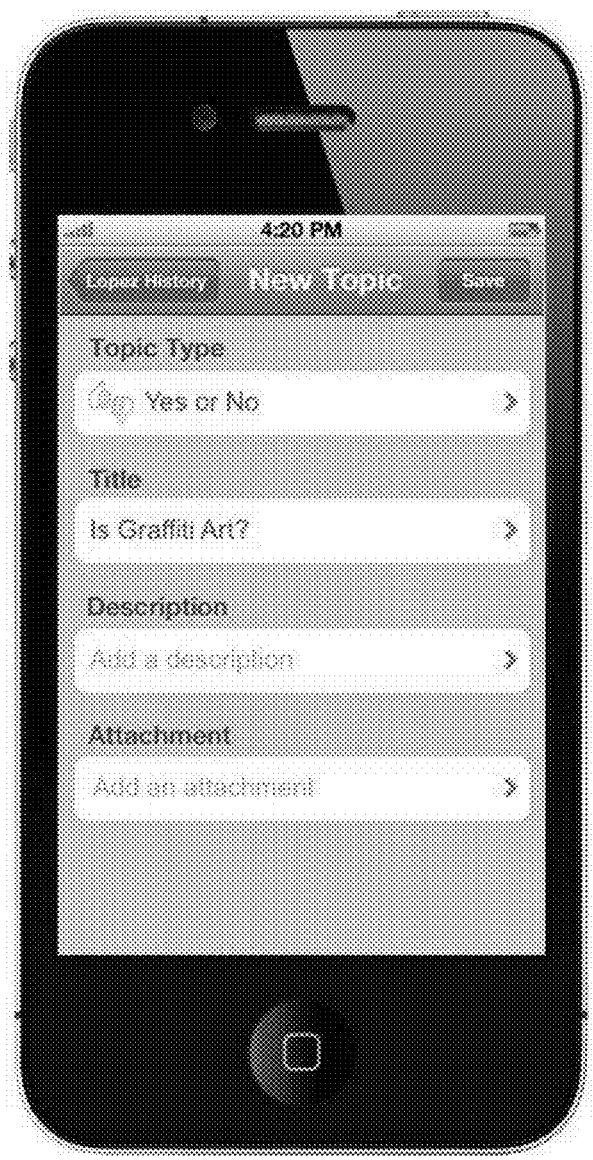

In another embodiment, the present invention may be implemented in the context of a mobile device or tablet computer. User 105A may utilize the image capturing capability of a mobile device or tablet computer to create a topic for discussion. A topic, for example may be based on an image captured by the mobile device or a pre-existing image that is stored in a library of the mobile device. Similar to the tool bar within web browser 300, user 105A may be asked to enter or select a "Topic Type" as shown in FIGS. 4A-4B. User 105A may select a "Topic Type" (such as "Yes or No" in FIG. 4C) and enter a title associated with the topic as shown in FIGS. 4D-4E.

Figure 3E:
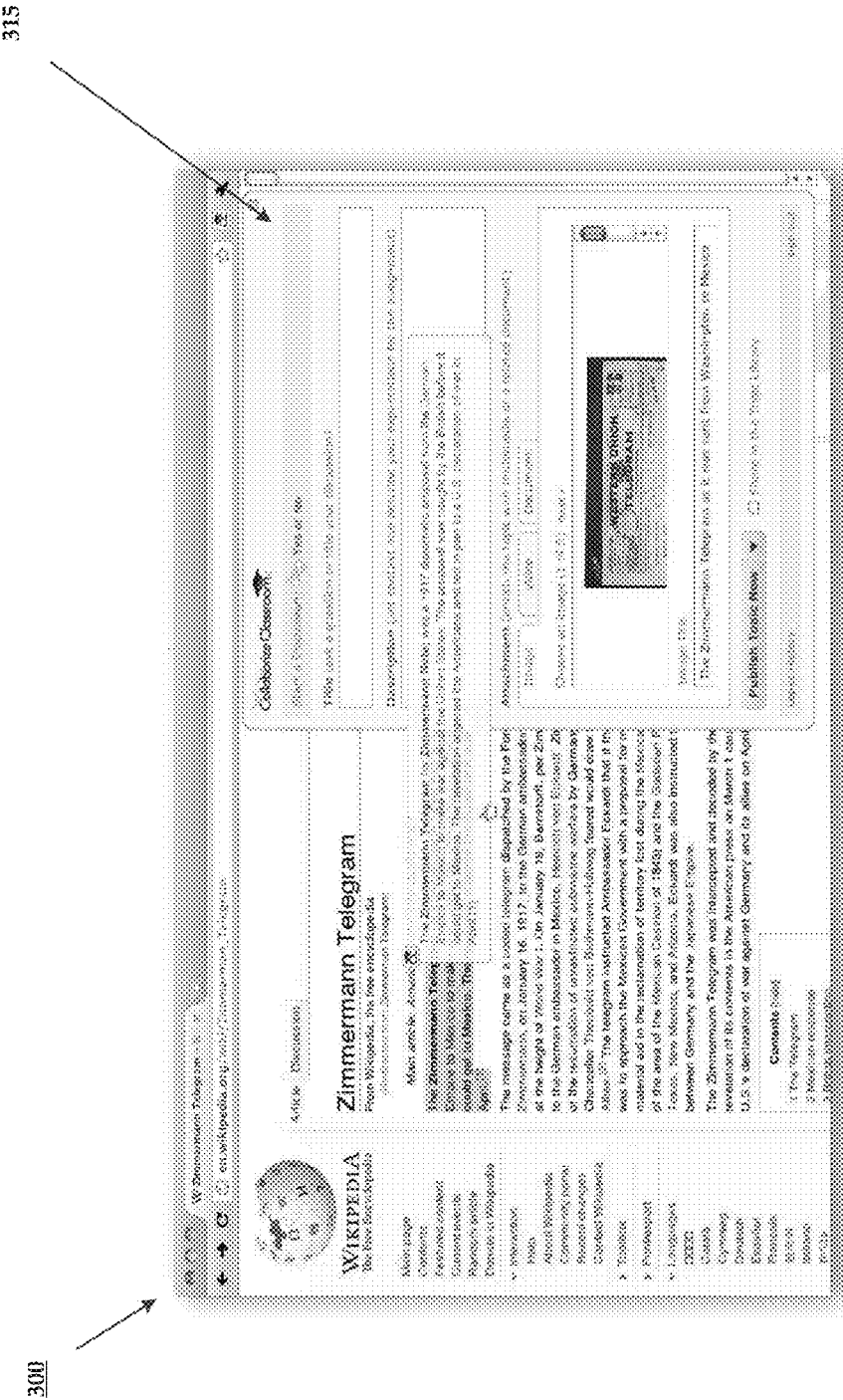
Figure 3F:
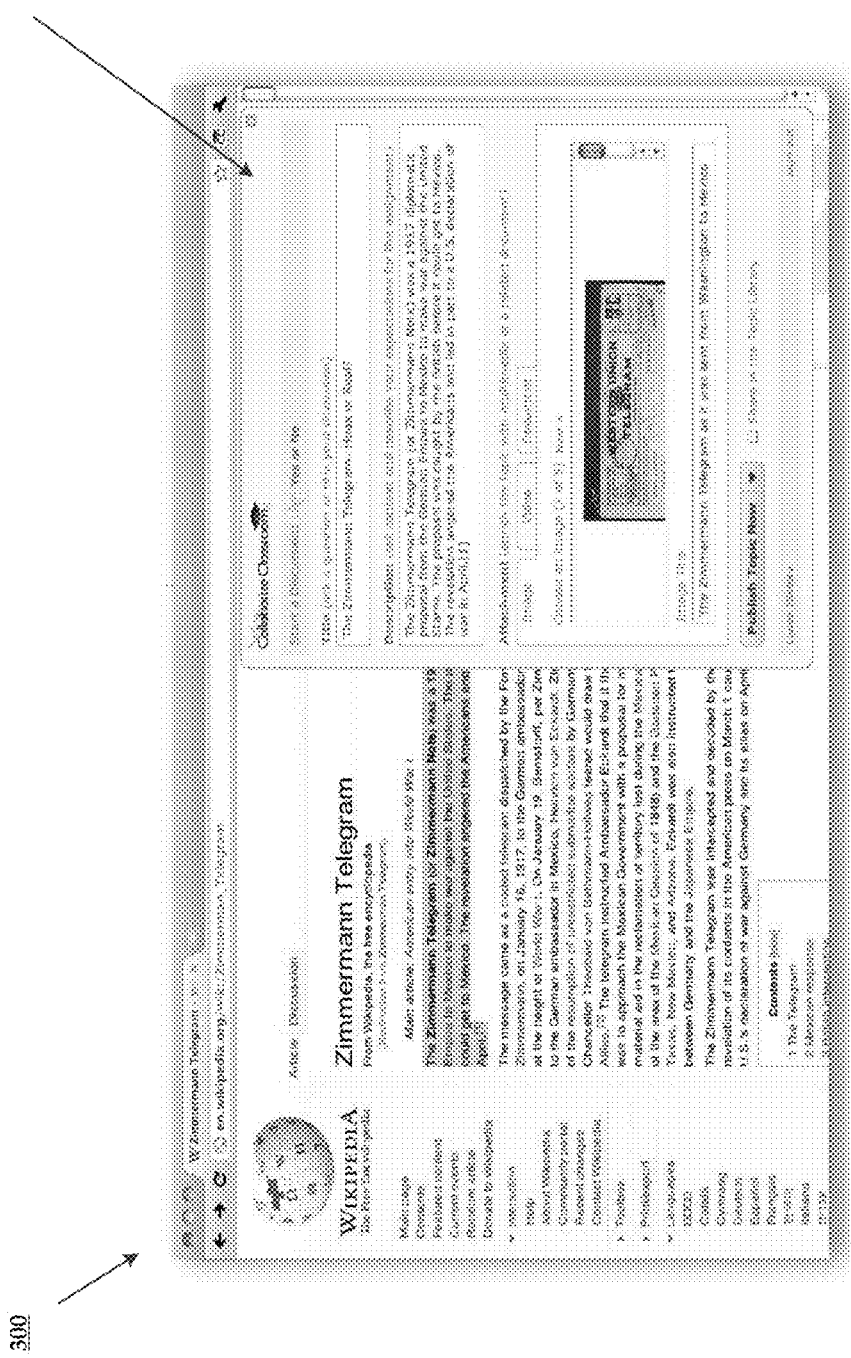
Figure 3G:
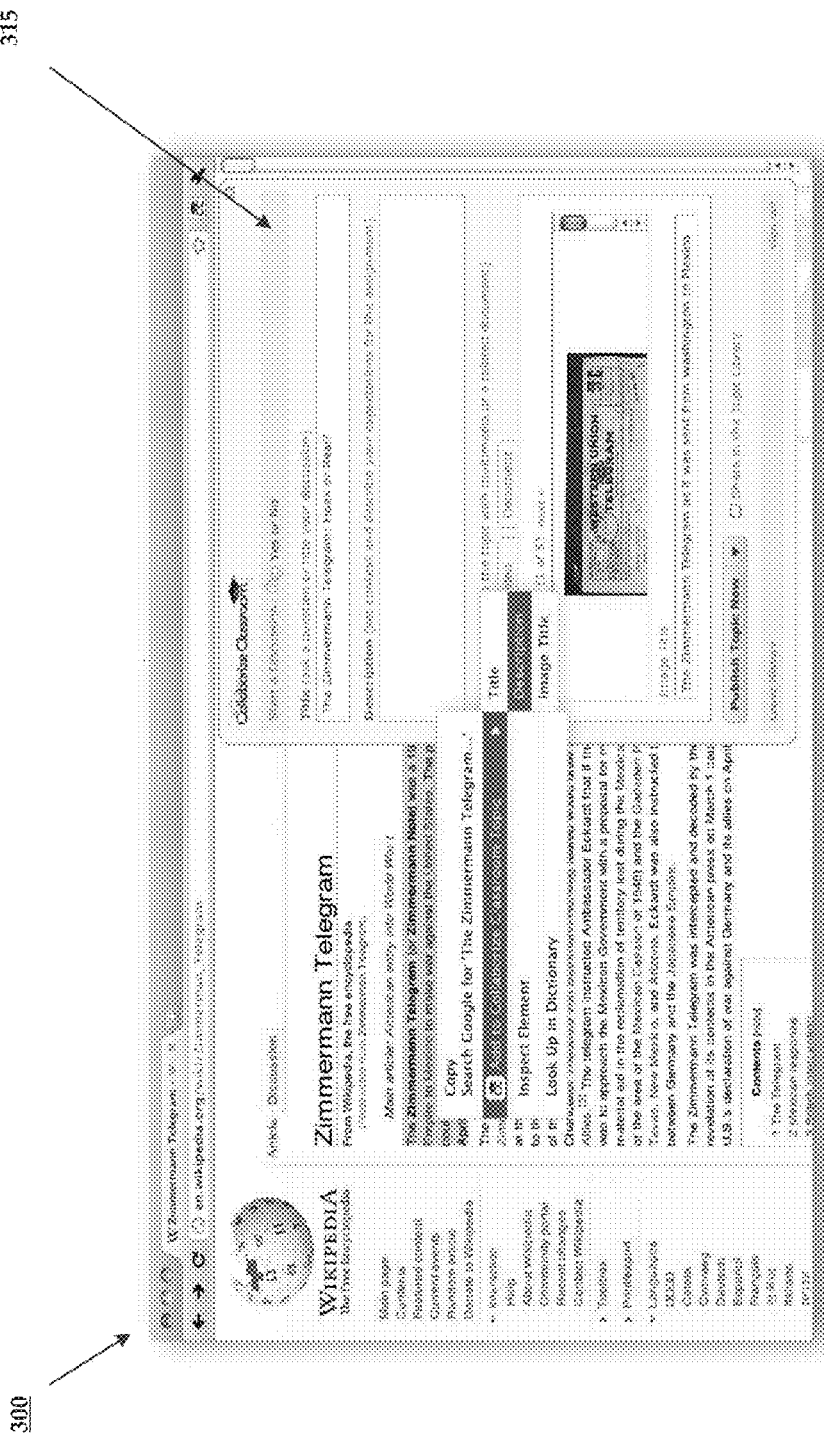
Figure 3H:
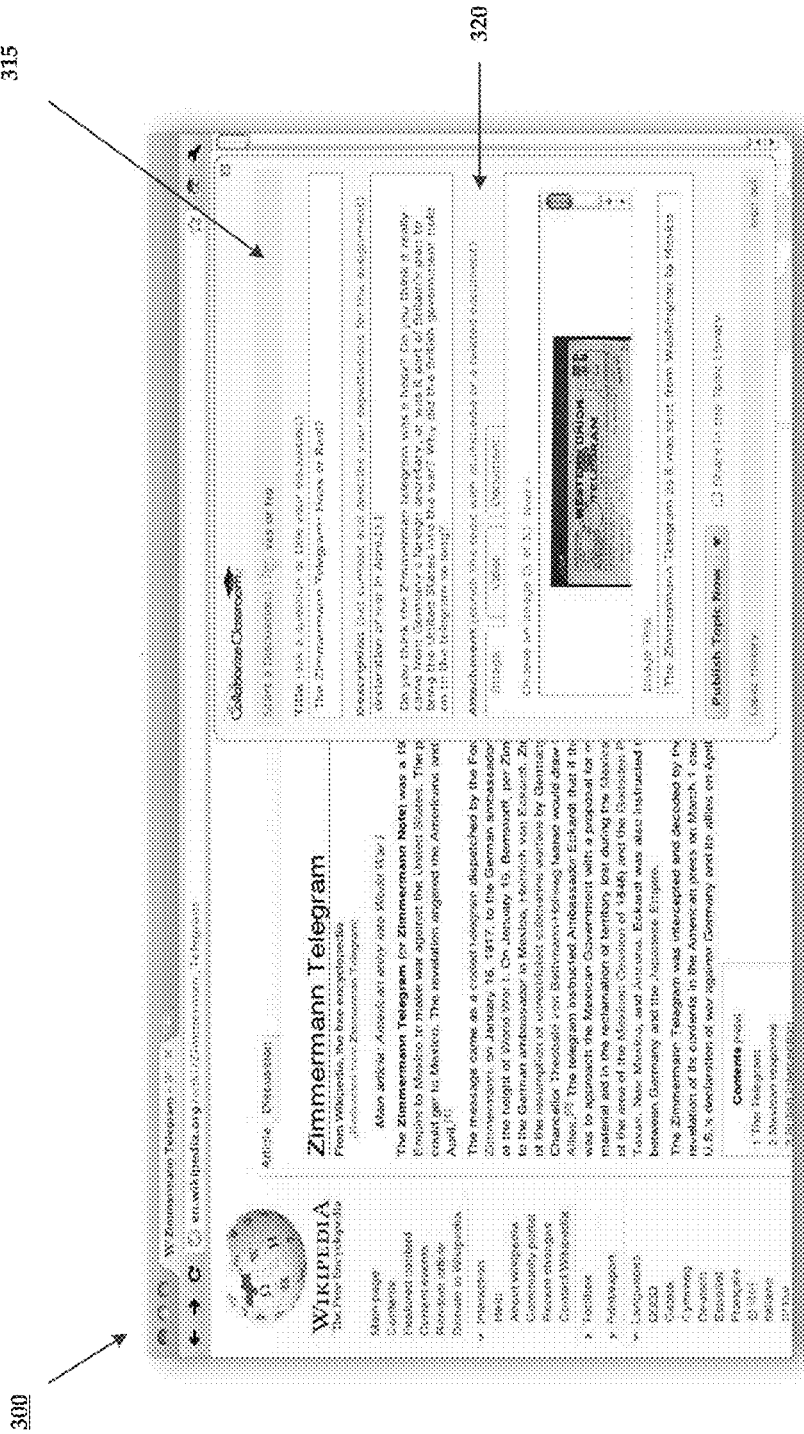
Figure 5A:
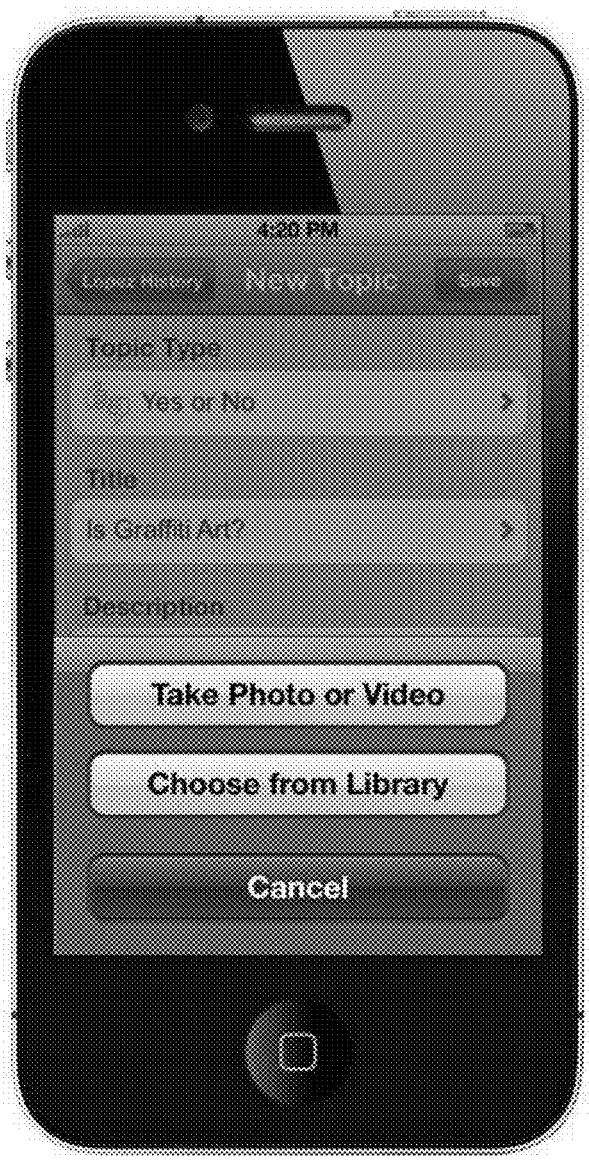
FIGS. 5A-5G illustrate interfaces displaying an attachment in a mobile device.
Figure 5B:
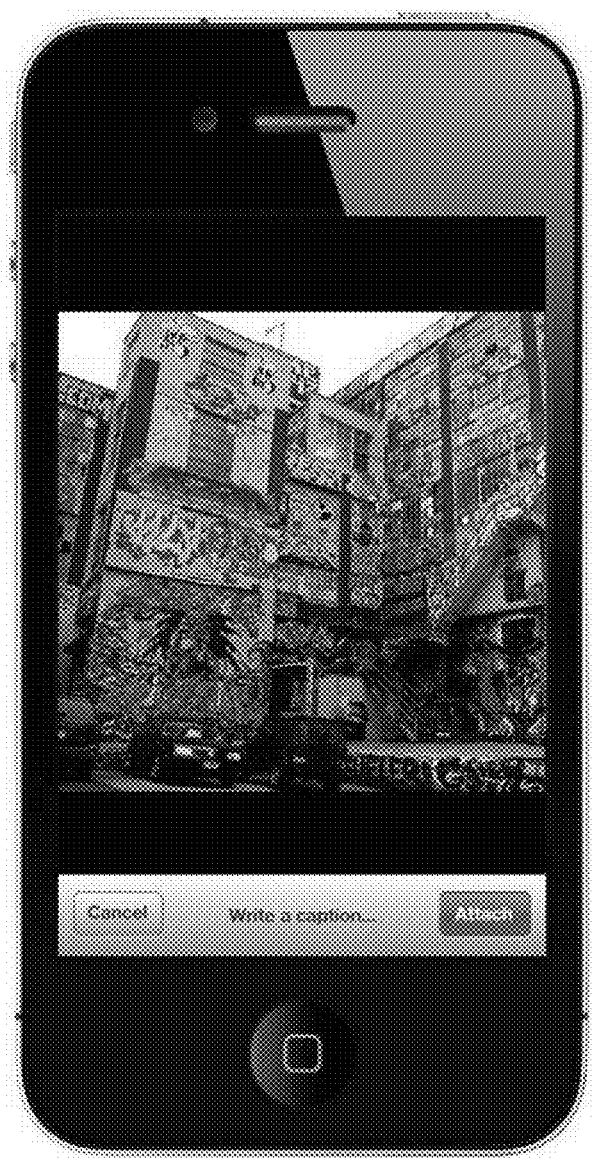
Figure 5C:
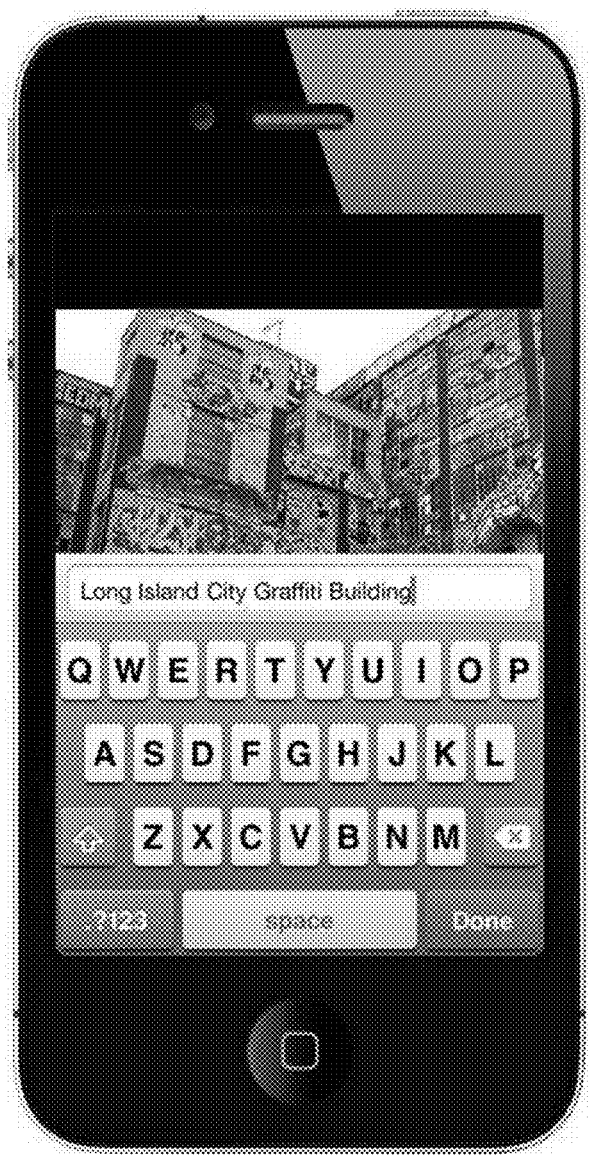
Figure 5D:
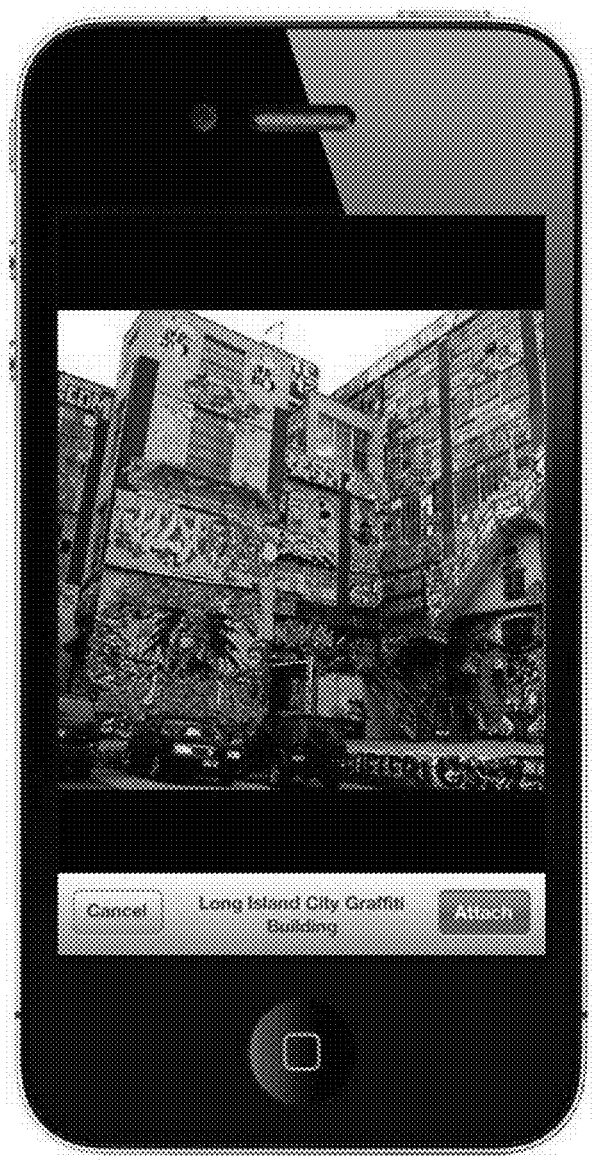

At step 220, application server 125 receives tagged or "grabbed" content from user 105A. Content may include content in its entirety (e.g., entire file) or portions, fragments, sections thereof. An educator, for example, may highlight content on a page or browser as shown in the interface illustrated in FIG. 3D. In one embodiment, the participant is able to designate the highlighted words as the title or as part of a body copy by dragging and dropping the highlighted content into an appropriate area of the ask modal 315 (as shown in FIG. 3E). A participant may also click on or select a corresponding word in the ask modal 315 which results in the highlighted content being transferred or populated into the ask modal 315 (as shown in FIG. 3F). Alternatively, as shown in FIG. 3G, the participant may right-click on highlighted content to add the content to the ask modal 315. In addition to content available via the Internet, a participant may add other content as an attachment. FIG. 3H illustrates ask modal 315 including attachment 320.

Where a user 105A is using a mobile device to create a topic, FIG. 5A illustrates an exemplary screen prompting user 105A to identify media as an attachment. User 105A may capture an image with the mobile device or choose a pre-existing image from a library and incorporate the chosen image into a new topic or discussion as shown in FIG. 5A. Where user 105A has selected the "Take Photo or Video" button incorporated in the interface of a mobile device, user 105A may capture an image or video as shown in FIGS. 5A-5B and enter a caption for such image or video as shown in FIGS. 5C-5D. A caption or other descriptive content may be provided by user 105A using keyboard capabilities present on the mobile device.

Figure 4F:
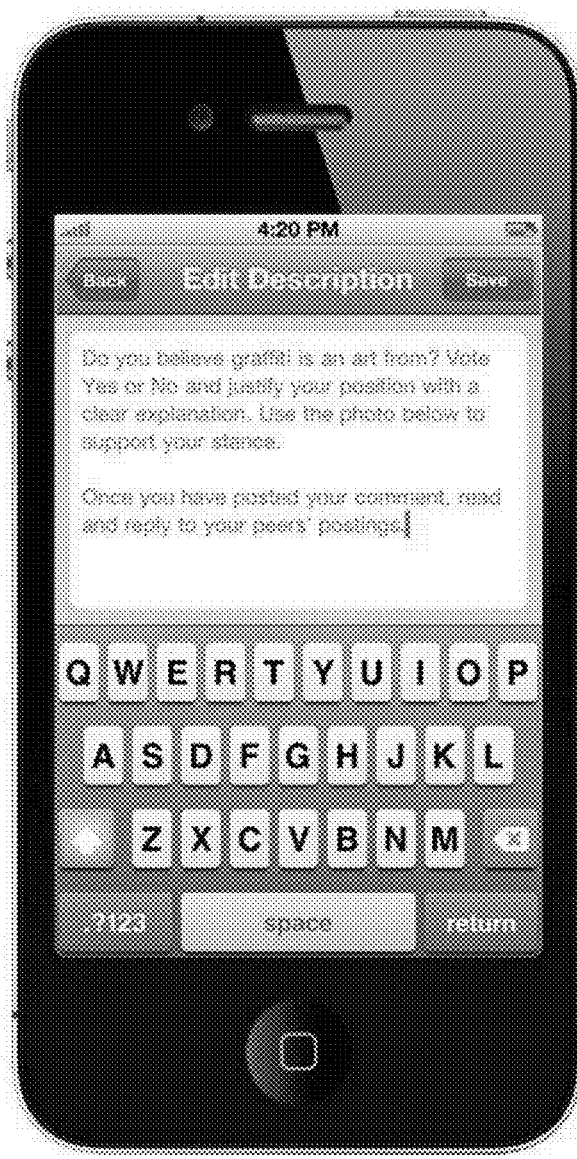
Figure 4G:
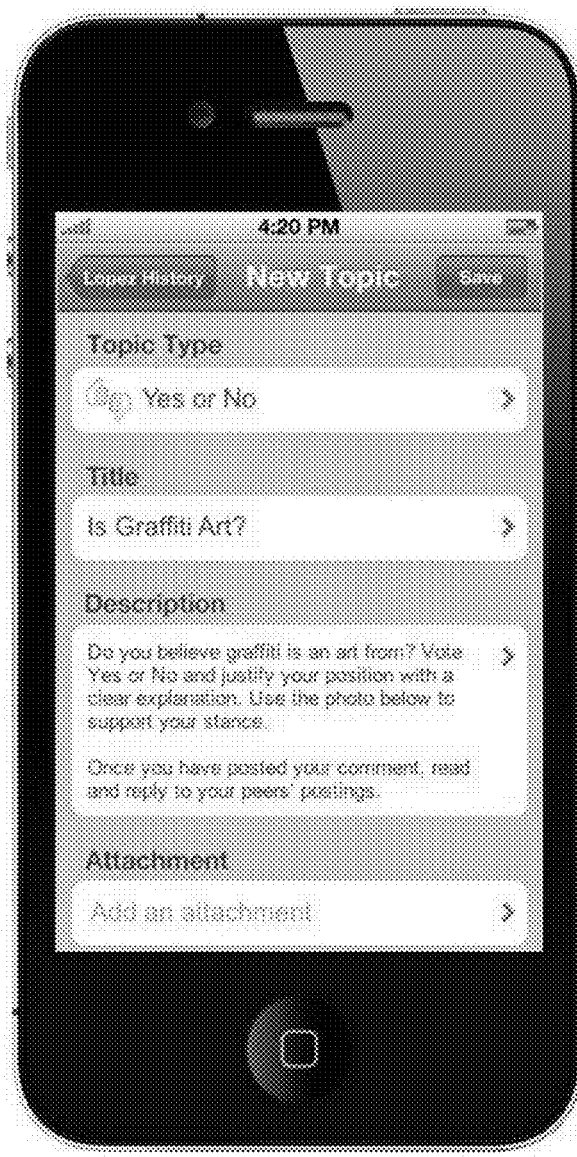
Figure 5E:

User 105A may provide descriptive information regarding the topic or tagged content. At step 230, application server 125 receives descriptive information from user 105A. Descriptive information may include any other detail or feature associated with the topic such as a caption, heading, summary, write-up, synopsis, blurb, or the like. Descriptive information may further include an attachment such as an image, picture, drawing, photo, video, or other media file. Where a topic is created using a mobile device, FIG. 4F illustrates an interface where a description associated with the content may be entered. FIG. 4G illustrates an interface on a mobile device where an educator has chosen a "Topic Type" and provided a title and description for the tagged content. As another example, FIG. 5E illustrates an exemplary screen of the interface of the mobile device in which user 105A has entered a title, description, and attachment (i.e., image with a caption) for submission as a new topic or discussion.

Figure 3I:
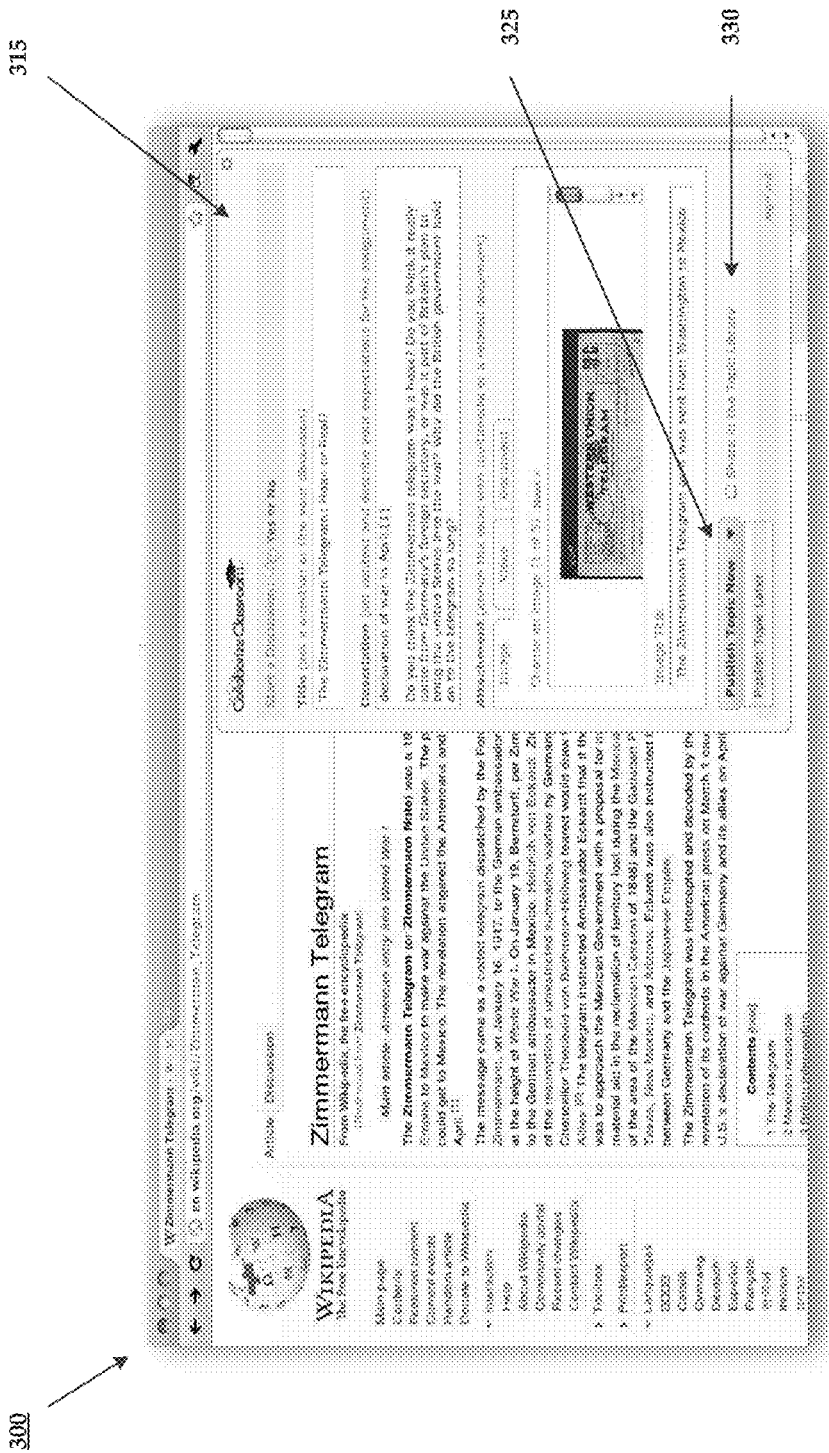

At step 240, application server 125 uploads, publishes, and/or shares the tagged content into a forum of the online learning environment for display to all participants. After providing tagged content and applicable descriptive information and/or attachments, user 105A may choose to immediately share the content into the online learning environment by selecting "Publish Topic Now" from drop down menu 125 as shown in FIG. 3I. Alternatively, user 105A may choose to share the content at a later time by selecting "Publish Topic Later" from drop down menu 325. Using the tool bar and ask modal, an educator is thus able to find or create content and bring the content into a classroom for discussion in real-time or at a later time.

User 105A may also determine or specify access rights for created content. User 105A, for example, may specify that only certain participants, or groups of participants, be able to review and access particular content.

Figure 5F:
Figure 5G:

Tagged content and applicable descriptive information may be shared and saved to a topic library at any time (e.g., upon initial creation or at a later time). A topic library may store discussion topics created from various participants of the collaborative learning service. FIG. 3I also includes a "Share in the Topic Library" box or setting 330 that a content creator, such as user 105A, may select to store the tagged content in a topic library and allow another user in the collaborative learning service to access and view the content in the topic library. Alternatively, or in addition, tagged content may be stored in a private online location or on a specific device communicatively coupled to the network 115. FIG. 5F shows an exemplary interface for selecting publication options when content creation occurs using a mobile device. FIG. 5G shows an exemplary interface for saving a partial or complete topic or discussion to a topic library.

In one embodiment, tagged content may be associated with metadata to identify the tagged content within the topic library for subsequent retrieval by one or more participants. Content may be cataloged and embedded with codes, tags, or other indicia to allow for tracking and searching. The topic library may be arranged by topics. A user 105A who has created a topic or provided tagged content, for example, may choose from available keywords or assign keywords to the topic or content. Participants may use the keywords to search, retrieve, and locate topics or discussions in the collaborative learning service.

Participants of the collaborative learning service may then provide feedback in response to the posted content. At step 250, application server 125 receives feedback from one or more participants and updates the forum with such feedback. A forum may be open to receive feedback for a particular time period such that feedback may not be received (and the forum not updated) after an expiration date.

In one embodiment, feedback may be in the form of a rating regarding the content. Participants may rate the content being presented in a variety of manners known in the art such as by giving a "thumbs up" or "thumbs down," assigning a number value to the content based on a scale, awarding stars or other indicia, or the like. As a result of real-time, ongoing rating of a topic, application server 125 may generate and track a cumulative rating for a particular topic. Such use of ratings allows for the identification of educators and students who have contributed topics to a topic library as particularly valuable. Other concepts regarding voting and rating and implementation of the same are described in patent application No. 61/418,794 and entitled "Template Driven Nomination with Real Time and Dynamic Voting," the disclosure of which is incorporated herein by reference.

In one embodiment, feedback provided by participants is tracked and recorded. For example, application server 125 may track on a time-stamped basis the participation of an entire class of participants or the participation of an individual participant. Such record of contribution and participation levels may assist an educator when assigning grades to a participant.

In another embodiment, access to the collaborative learning service or to a particular content may be free or subject to a fee. In one embodiment, a content contributor may collect fees for access to particular content.

Figure 6:
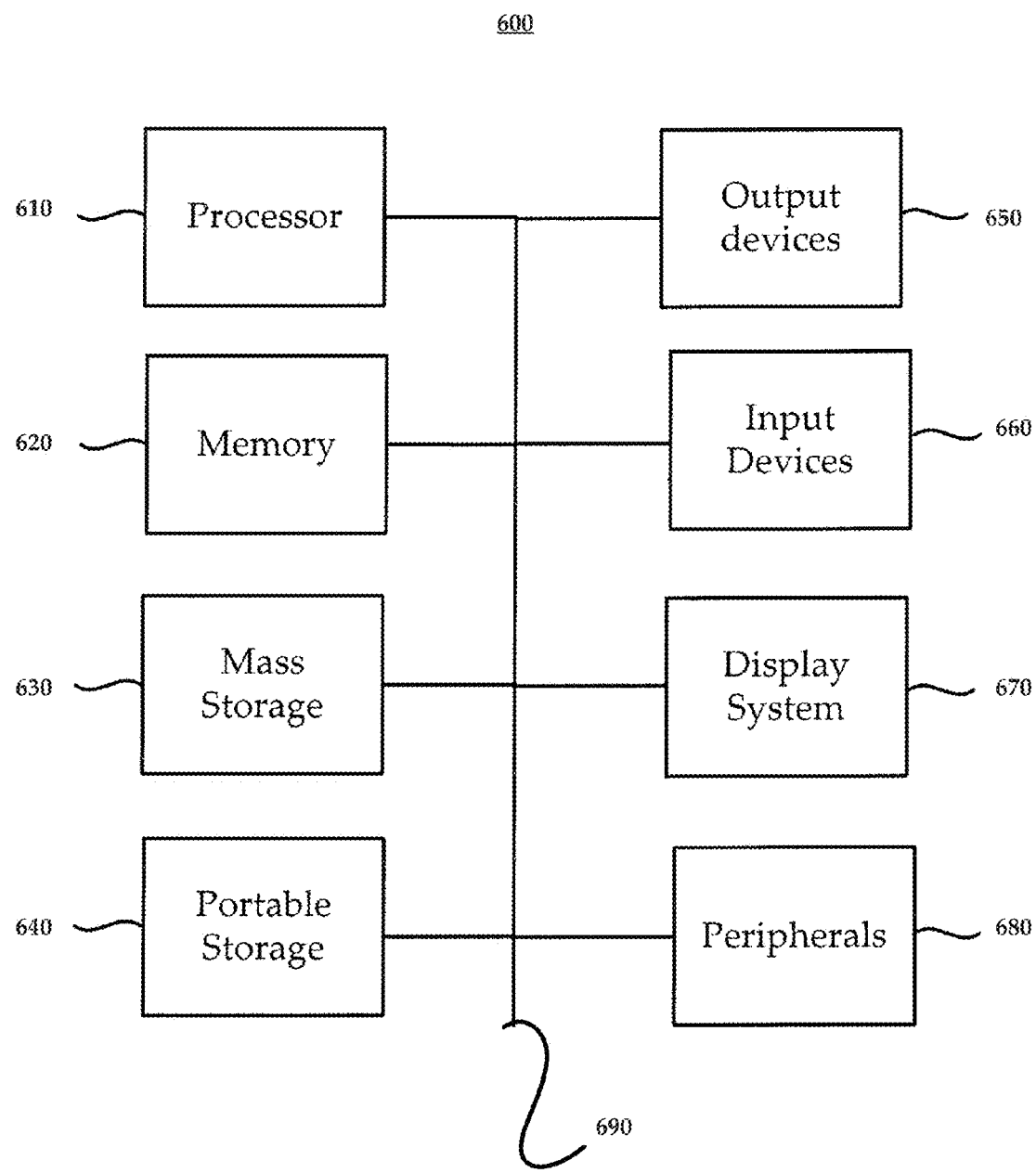
FIG. 6 illustrates a computing system that may be used to implement an embodiment of the present invention.

FIG. 6 illustrates a computing system 600 that may be used to implement the present technology. System 600 of FIG. 6 may be used to implement computing devices 110A and 110B, network server 120, application server 125, and database 130 in the context of the system of FIG. 1. The computing system 600 of FIG. 6 includes one or more processors 610 and memory 620. Main memory 620 stores, in part, instructions and data for execution by processor 610. Main memory 620 can store the executable code when in operation. Main memory 620 may also include a database such as database 130 illustrated in FIG. 1. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. The components, however, may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present invention for purposes of loading software into main memory 620.

Portable storage device 640 operates in conjunction with a portable nonvolatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 may receive textual and graphical information, and process the information for output to the display device.

Peripherals 680 may include any type of computer support device to add additional functionality to the computer system. For example, peripheral device(s) 680 may include a modem or a router.

The components contained in the computing system 600 of FIG. 6 are those typically found in computer systems that may be suitable for use with embodiments of the present invention and are intended to represent a broad category of such computer components that are well known in the art. Thus, the computing system 600 of FIG. 6 may be a personal computer, hand held computing device, tablet computer, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows Mobile, or iOS. The steps of the method of FIG. 2 (and its various alternatives) may be performed by a module or engine stored on a computer readable storage medium (e.g., optical disc, memory card, etc.) comprising instructions executable by a processor of a computing device.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A method for creating content in an online learning environment, comprising:
   creating a topic for discussion between a plurality of participants in an online learning environment, wherein the topic for discussion includes a title;
   receiving tagged content over a network, the tagged content received from a computing device associated with a participant from the plurality of participants, wherein the tagged content is associated with the topic for discussion;
   receiving descriptive information from the participant regarding the tagged content; and
   executing instructions stored in memory, wherein execution of the instructions by a processor:
      publishes the tagged content into a forum of the online learning environment for discussion; and
      updates the forum with feedback received from one or more participants in the online learning environment in response to the tagged content, wherein the topic for discussion, associated tagged content, descriptive information, and received feedback form a self-contained learning unit, the self-contained learning unit embeddable in a digital environment.

2. The method of claim 1, further comprising tracking participation of the one or more participants on a time-stamped basis.

3. The method of claim 1, wherein feedback regarding the topic for discussion may not be received after an expiration date associated with the topic for discussion.

4. The method of claim 1, further comprising storing the tagged content in a library of topics.

5. The method of claim 4, wherein the tagged content is associated with metadata identifying the tagged content within the library of topics for subsequent retrieval of the tagged content by the one or more participants.

6. The method of claim 1, wherein the feedback includes a rating of the topic for discussion.

7. The method of claim 6, wherein the execution of instructions by the processor further generates a cumulative rating of the topic for discussion based on the received feedback.

8. The method of claim 1, wherein the tagged content includes a photo.

9. The method of claim 1, wherein the tagged content includes a video.

10. The method of claim 1, wherein the description information includes a caption.

11. The method of claim 1, wherein the description information includes a photo associated with the tagged content.

12. The method of claim 1, wherein the computing device is a mobile device and the tagged content includes a photo captured by the mobile device.

13. The method of claim 1, further comprising assessing a fee to the one or more participants that have provided feedback in response to the tagged content.

14. A system for creating content in an online learning environment, comprising:
    memory that stores tagged content received over a network, the tagged content received from a computing device associated with a participant from a plurality of participants in the online learning environment, wherein the tagged content is associated with a topic for discussion; and
    an application server that:
        creates a topic for discussion between a plurality of participants in an online learning environment, wherein the topic for discussion includes a title,
        receives tagged content over the network,
        receives descriptive information from the participant regarding the tagged content;
        publishes the tagged content into a forum of the on-line learning environment for discussion; and
        updates the forum with feedback received from one or more participants in the online learning environment in response to the tagged content, wherein the topic for discussion, associated tagged content, descriptive information, and received feedback form a self-contained learning unit, the self-contained learning unit embeddable in a digital environment.

15. A non-transitory computer-readable storage medium, having embodied thereon a program, the program being executable by a processor to perform a method creating content in an online learning environment, the method comprising:
    creating a topic for discussion between a plurality of participants, wherein the topic for discussion includes a title;
    receiving tagged content from a participant of the plurality of participants, wherein the tagged content is associated with the topic for discussion;
    receiving descriptive information regarding the tagged content; and
    publishing the tagged content into a forum for discussion; and
    updating the forum with feedback received from one or more participants in response to the tagged content, wherein the topic for discussion, associated tagged content, descriptive information, and received feedback form a self-contained learning unit, the self-contained learning unit embeddable in a digital environment.

* * * * *